(Model.)

J. A. DALY.
FOIL LINED DENTAL PLATE.

No. 390,654.            Patented Oct. 9, 1888.

Attest:
L. M. Bartlett
F. B. Brock

Inventor:
John A. Daly
By W. A. Bartlett
atty.

UNITED STATES PATENT OFFICE.

JOHN A. DALY, OF WASHINGTON, DISTRICT OF COLUMBIA, ASSIGNOR TO FREDERICK F. DALY, OF SAME PLACE.

FOIL-LINED DENTAL PLATE.

SPECIFICATION forming part of Letters Patent No. 390,654, dated October 9, 1888.

Application filed January 6, 1886. Serial No. 187,803. (Model.)

*To all whom it may concern:*

Be it known that I, JOHN A. DALY, a citizen of the United States, residing at Washington, in the District of Columbia, have invented certain new and useful Improvements in the Art of Preparing and Uniting a Coating of Metal with Vulcanite Rubber and other Plastic Material for Dental and other Purposes; and I do hereby declare the following to be a full, clear, and exact description of the invention, such as will enable others skilled in the art to which it appertains to make and use the same.

The object of my invention is to so prepare a coating of gold or other metal and unite it with a plate of vulcanized rubber or other plastic material that it will firmly adhere thereto, and at the same time have its outer surface smooth and solid, and the method by which this is accomplished will be fully hereinafter described, and my special improvements pointed out in the claims.

Prior to this and other improvements of mine attempts have been made to cover or line vulcanite dental plates with a coating or foil of gold; but these experiments have failed of practically useful results, for the reason, as I believe, that the foil generally has a smooth, solid, finished surface in contact with the rubber, and will not adhere to the rubber even if it be vulcanized on the foil, as has been tried. Foils have been tried by myself, and perhaps others, having one surface beaten up, abraded, or with slight projecting portions attached by solder or other foreign substances. I have found these unsatisfactory.

Figure 1:
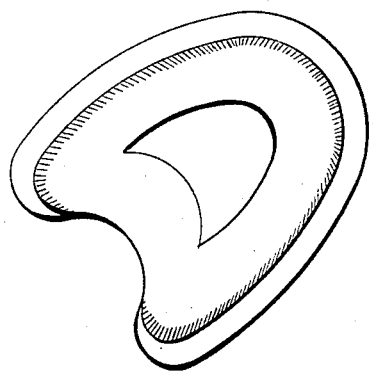
Figure 2:

Figure 1 shows foil-lined plate; Fig. 2, section of plate and lining.

My present improvement enables me to produce a dental plate of vulcanite or other plastic material coated or lined to any desired extent with a gold or other metal plate of any desired thickness, so firmly united to it that it will be impossible to separate the two by any ordinary mechanical means. This I do by so preparing the coating or lining that the surface in contact with the vulcanite or other plastic material is rough and porous, while the other or outer surface is smooth and solid. Usually the part lined or coated is that which comes in contact with the mucous membrane of the mouth, so that no ill effects may result from the use of vulcanite or other plastic material; but all the surfaces of the rubber plate may be coated with gold or other metal, substantially as described.

I will now proceed to describe my method of producing a gold-lined dental vulcanite plate.

I first prepare the gold lining or coating by taking a smooth sheet of gold-foil and making a heavy electro-deposit of gold on one side only of the same of such thickness as may be desired. The electro-deposit is obtained on one side of the foil by placing the sheet or leaf of gold-foil on a non-conducting plate—as plaster-of-paris or vulcanized rubber. The foil may be secured on the non-conducting plate by a film of adhesive varnish. The edges of the sheet of foil are covered with a coating of wax or otherwise firmly held down, so that no liquid can enter between the sheet of foil and the non-conducting plate. A metallic connection having been made with some portion of the sheet of foil, the plate with the foil attached is placed in the solution and an electro-deposit is made on the exposed surface. I prefer the foil known technically as "No. 10," "No. 20," or "No. 30." This electro deposit is continued until it becomes sufficiently rough and porous to form a mechanical union with the vulcanite when applied to it, and may be made either after accurately adapting the foil to the plaster model and then depositing on it, or first making the deposit on the sheet of foil and afterward cutting and fitting the lining to the plaster model or directly to the rubber after it is molded and before vulcanizing. In the former case it is necessary to use well-known methods to protect the plaster model from the action of the chemicals in the gold solution and to prevent the solution from getting between the foil and the model. In the latter case the pieces of lining as they are put on must be made to adhere to the model or to the molded rubber by proper varnishes or solutions. In the former case the rubber is packed and vulcanized by the usual methods after the lining is fitted to the model and prepared. In the latter the rubber is packed before and vulcanized after the prepared lining is properly fitted. After the plate is vulcanized the gold lining is finished with a scratch-brush and burnisher and the rubber surfaces in the usual methods.

I do not herein claim a metallic foil having one burnished and one porous surface, the same forming the subject-matter of my application filed March 3, 1888, to which the Patent Office gives the serial number 266,040. In my former patent, 306,468, I used an electro deposited film, but not a foil proper having a burnished and a roughened surface.

What I claim is—

1. A vulcanized dental plate having its surface wholly or partly covered with a single metal foil which has a burnished outer surface, the metallic coating having a uniformly rough and porous under surface firmly united mechanically with the vulcanite, substantially as described.

2. The method of making a vulcanite or similar dental plate, which consists in preparing a foil of a single metal which is smooth on one surface and uniformly rough and porous on the other, placing this foil on the mold with its porous surface in contact with the plastic material, and then vulcanizing the plate, substantially as described.

In witness whereof I affix my signature in the presence of two witnesses this 6th day of January, A. D. 1886.

JOHN A. DALY.

Witnesses:
T. FISHER CLARK,
ANSON S. TAYLOR.